(12) United States Patent
Lee et al.

(10) Patent No.: US 10,294,915 B2
(45) Date of Patent: May 21, 2019

(54) TIDAL POWER GENERATOR

(71) Applicants: Jai-Hyuk Lee, Seoul (KR); Jae-Wook Lee, Gwangju-si (KR)

(72) Inventors: Jai-Hyuk Lee, Seoul (KR); Jae-Wook Lee, Gwangju-si (KR)

( * ) Notice: Subject to any disclaimer, the term of this patent is extended or adjusted under 35 U.S.C. 154(b) by 263 days.

(21) Appl. No.: 15/547,507

(22) PCT Filed: Jun. 16, 2015

(86) PCT No.: PCT/KR2015/006061
§ 371 (c)(1),
(2) Date: Jul. 30, 2017

(87) PCT Pub. No.: WO2016/032099
PCT Pub. Date: Mar. 3, 2016

(65) Prior Publication Data
US 2018/0003148 A1 Jan. 4, 2018

(30) Foreign Application Priority Data

Aug. 26, 2014 (KR) .......................... 10-2014-0111771

(51) Int. Cl.
*F03B 13/26* (2006.01)
*F03B 15/02* (2006.01)
(Continued)

(52) U.S. Cl.
CPC ............ *F03B 13/26* (2013.01); *F03B 13/264* (2013.01); *F03B 15/02* (2013.01); *F03B 17/063* (2013.01);
(Continued)

(58) Field of Classification Search
USPC ........................................................ 415/3.1
See application file for complete search history.

(56) References Cited

U.S. PATENT DOCUMENTS 7,874,788 B2 * 1/2011 Stothers .................... F03B 3/04
415/148
8,348,623 B2 * 1/2013 Vasshus .................... F03B 7/00
137/14
(Continued)

FOREIGN PATENT DOCUMENTS

| KR | 10-0510327 B1 | 8/2005 |
| KR | 10-2010-0001454 A | 1/2010 |
| KR | 10-1184040 B1 | 9/2012 |
| KR | 10-2013-0038005 A | 4/2013 |
| KR | 10-1430428 B1 | 8/2014 |

OTHER PUBLICATIONS

KR Notification of Reason for Refusal dated Jan. 2, 2015 as received in Application No. 10-2014-0111771 (English Translation).

(Continued)

*Primary Examiner* — Erick R Solis
(74) *Attorney, Agent, or Firm* — Maschoff Brennan (57) ABSTRACT

According to an embodiment of the present invention, a tidal power generator may comprise: a plurality of channel levees which are arranged spaced apart from each other so as to form a channel having a constant width and which have a plurality of installation grooves, each being formed by recessing the surface facing the channel, wherein a tidal current can move forward/backward in the channel; a first water collection levee extending from the front end of the channel levees with reference to a movement direction of the tidal current and having a peak shape of which the width is gradually reduced towards the front side of the channel; a second water collection levee extending from the rear end of the channel levees with reference to the movement direction of the tidal current and having a peak shape of which the width is gradually reduced towards the rear side of the channel; and a waterwheel module which is inserted and (Continued)

installed in the installation groove and can generate power using movements of the tidal current.

2 Claims, 5 Drawing Sheets

(51) Int. Cl.
　　*F03B 17/06*　　　(2006.01)
　　*B63B 35/44*　　　(2006.01)
(52) U.S. Cl.
　　CPC . *B63B 2035/4466* (2013.01); *F05B 2210/404* (2013.01); *F05B 2220/706* (2013.01); *F05B 2240/13* (2013.01); *F05B 2240/301* (2013.01); *F05B 2240/60* (2013.01); *Y02E 10/28* (2013.01)

(56) References Cited

U.S. PATENT DOCUMENTS

| | | | | |
|---:|---|---|---|---|
| 8,616,830 | B2 * | 12/2013 | Unno | F03B 3/183 |
| | | | | 290/43 |
| 9,651,018 | B2 * | 5/2017 | Vorias | F03D 3/0427 |
| 10,041,468 | B2 * | 8/2018 | Lai | F03B 13/10 |
| 2016/0237981 | A1 | 8/2016 | Lee et al. | |

OTHER PUBLICATIONS

KR Grant of Patent dated Mar. 25, 2015 as received in Application No. 10-2014-0111771 (English Translation).

\* cited by examiner

TIDAL POWER GENERATOR

TECHNICAL FIELD

The present invention relates to a bidirectional tidal power generation apparatus, and more particularly, to a tidal power generation apparatus that is easily installed and separated using modular waterwheel modules, and is configured such that waterwheel blades do not come into contact with tidal current in a region incapable of absorbing tidal energy, thereby minimizing rolling resistance, whereby power generation efficiency may be enhanced.

BACKGROUND ART

General power generation methods can be classified into hydroelectric power generation using water, thermal power generation using fossil energy, nuclear power generation, and the like.

Recently, power generation, using natural forces such as wind power, solar power, tidal power, and the like, which are environmentally-friendly green energy resources, has drawn attention.

Hydroelectric power generation has problems in terms of finding suitable locations and high construction costs, thermal power generation has problems in terms of atmospheric warming and pollution, and nuclear power generation has problems such as backlash from local residents and radioactivity. In addition, wind power and solar power have problems in terms of stable power supply according to weather changes, and tidal power generation has problems in terms of finding suitable locations and the like.

DISCLOSURE

Technical Problem

Therefore, the present invention has been made in view of the above problems, and it is one object of the present invention to provide a tidal power generation apparatus that may have enhanced tidal energy absorption efficiency by forming a wide contact surface between vertical waterwheel blades or horizontal waterwheel blades and a water surface.

It is another object of the present invention to provide a tidal power generation apparatus that may prevent waterwheel blades from being brought into contact with the tidal current in a region incapable of absorbing tidal energy.

It is yet another object of the present invention to provide a tidal power generation apparatus that is easily installed and separated using modular waterwheel modules.

The above and other objects can be accomplished by the present disclosure described below and the accompanying drawings.

Technical Solution

In accordance with one aspect of the present invention, provided is a tidal power generation apparatus including: a plurality of channel levees spaced apart from each other to form a channel having a constant width, allowing tidal current to move forward or backward of the channel, and each having a plurality of installation grooves formed in a recessed shape at a surface thereof facing the channel; a first water collection levee extending from a front end of the channel levee based on a movement direction of the tidal current and having a tapered shape such that a width thereof gradually decreases towards the front of the channel; a second water collection levee extending from a rear end of the channel levee based on a movement direction of the tidal current and having a tapered shape such that a width thereof gradually decreases towards the rear of the channel; and waterwheel modules inserted into the installation grooves and capable of generating power using movement of the tidal current.

The waterwheel module may include: a vertical waterwheel including a vertical waterwheel shaft vertically installed in the installation groove and vertical waterwheel blades connected to the vertical waterwheel shaft, radially arranged based on the vertical waterwheel shaft, and having a flat plate shape; a main frame including a lower fixing support positioned at a lower portion of the vertical waterwheel shaft to support a lower end of the vertical waterwheel shaft, an upper plate cover positioned above the lower fixing support and supporting an upper end of the vertical waterwheel shaft, and a support frame positioned at one side of the vertical waterwheel shaft and connected to the lower fixing support and the upper plate cover; vertical waterwheel upper and lower blade support plates coupled to the vertical waterwheel shaft and positioned at upper and lower portions, respectively, of the vertical waterwheel blades to respectively support upper and lower ends of the vertical waterwheel blades; and a generator connected to the vertical waterwheel shaft and generating power using rotational force of the vertical waterwheel shaft.

The vertical waterwheel blades may have one shape selected from an uneven cross-sectional shape, a wavy cross-sectional shape, and a toothed cross-sectional shape.

In accordance with another aspect of the present invention, provided is a tidal power generation apparatus including: an air cushion vessel installed at sea, having a shape such that a width thereof decreases towards a bow and a stern based on a movement direction of a tidal current, and having a plurality of installation holes vertically opened; a horizontal waterwheel including a horizontal waterwheel shaft horizontally installed in the installation hole, and horizontal waterwheel blades connected to the horizontal waterwheel shaft and radially arranged based on the horizontal waterwheel shaft; a generator installed at the air cushion vessel and connected to the horizontal waterwheel shaft to generate power using rotational force of the horizontal waterwheel shaft; a plurality of bow anchors symmetrically connected to each other at opposite sides of the bow and capable of fixing the bow with respect to movement of the tidal current; and a plurality of stern anchors symmetrically connected to each other at opposite sides of the stern and capable of fixing the stern with respect to movement of the tidal current.

The horizontal waterwheel blades may have one shape selected from an uneven cross-sectional shape, a wavy cross-sectional shape, and a toothed cross-sectional shape.

Advantageous Effects

Effects of a tidal power generation apparatus according to the present invention are as follows.

First, a single generator can generate power four times a day, i.e., during two rising tides and two ebbing tides, whereby power generation efficiency is enhanced.

Second, vertical waterwheel blades may be partially positioned in a channel in an area capable of absorbing tidal energy, and the vertical waterwheel blades may be positioned in an installation groove of a channel levee in an area incapable of absorbing tidal energy, thereby minimizing waterwheel resistance to the tidal current. Meanwhile, horizontal waterwheel blades may be partially positioned in the water in an area capable of absorbing tidal energy and the horizontal waterwheel blades may be positioned in atmospheric air in an area incapable of absorbing tidal energy, thereby minimizing rolling resistance, resulting in an increase in rotation rate of the horizontal waterwheel blades and an increase in power generation efficiency.

Third, an air cushion vessel can proceed straight with respect to a rising tide or an ebbing tide by using a bow anchor and a stern anchor. In addition, the air cushion vessel conveniently moves on the water surface, and thus can be fixedly installed conveniently using a bow anchor and a stern anchor in opposite directions in a place where the water is deep, the tidal current is strong, and civil engineering works are difficult to implement, thus being applied to a variety of fields.

Fourth, the vertical waterwheel blades or the horizontal waterwheel blades may have any one cross-sectional shape selected from an uneven shape, a wave shape, and a teeth shape, and thus have a wider surface area than that of a plane shape, and, accordingly, have a wide contact surface with the tide, resulting in an increase in energy absorption efficiency.

Fifth, a waterwheel module can be conveniently installed at or separated from installation grooves 10a of a channel levee, and thus convenient follow-up management can be provided.

BEST MODE

Hereinafter, embodiments of the present invention will be described in more detail with reference to the accompanying drawings. The embodiments of the present invention may take many different forms, and the scope of the present invention should not be construed as being limited to embodiments set forth herein. The embodiments of the present invention are provided to more particularly explain the present invention to those of ordinary skill in the art to which the invention pertains. Thus, the shape of each element illustrated in the drawings may be emphasized or exaggerated for clearer explanation.

Figure 1:
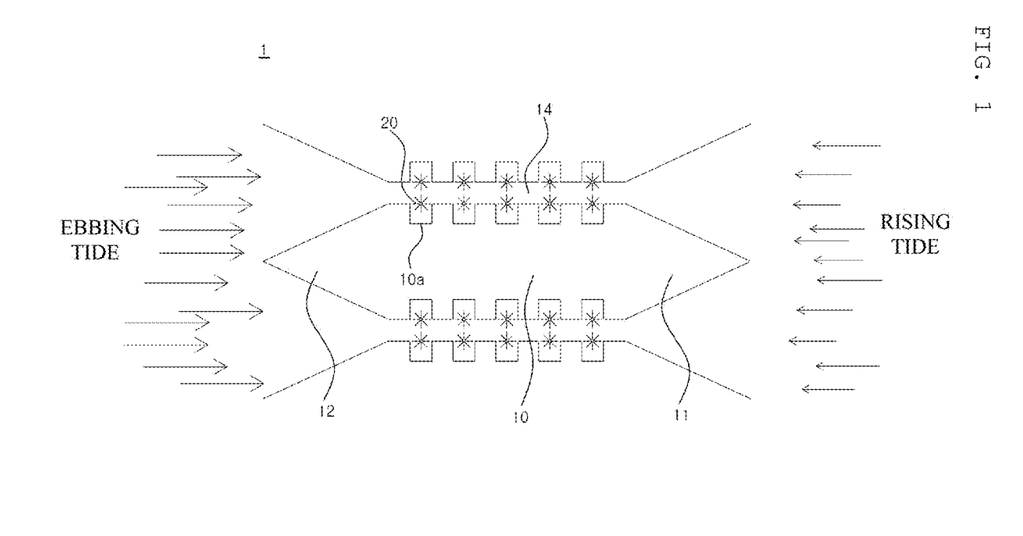
FIG. 1 is a schematic view illustrating a state in which a tidal power generation apparatus according to an embodiment of the present invention is installed in the sea.

FIG. 1 is a schematic view illustrating a state in which a tidal power generation apparatus according to an embodiment of the present invention is installed at sea. Referring to FIG. 1, the tidal power generation apparatus 1 according to an embodiment of the present invention may include a plurality of channel levees 10, first water collection levees 11, second water collection levees 12, waterwheel modules 20, and a generator 16.

A plurality of channel levees 10 may be spaced apart from each other in a width direction, and a channel 14 may be disposed between the channel levees 10. A plurality of installation grooves 10a may be formed in a recessed shape at a surface of the channel levee 10 facing the channel 14 in a length direction of the channel levees 10. The tidal current of the sea may move forward or backward of the channel 14 through the channel 14.

The first water collection levee 11 may extend from a front end of the channel levee 10 based on a movement direction of the tidal current. The first water collection levee 11 may have a tapered shape such that the width thereof gradually decreases towards the front of the channel 14.

The second water collection levee 12 may extend from a rear end of the channel levee 10 based on a movement direction of the tidal current. The second water collection levee 12 may have a tapered shape such that the width thereof gradually decreases towards the rear of the channel 14.

Figure 2:
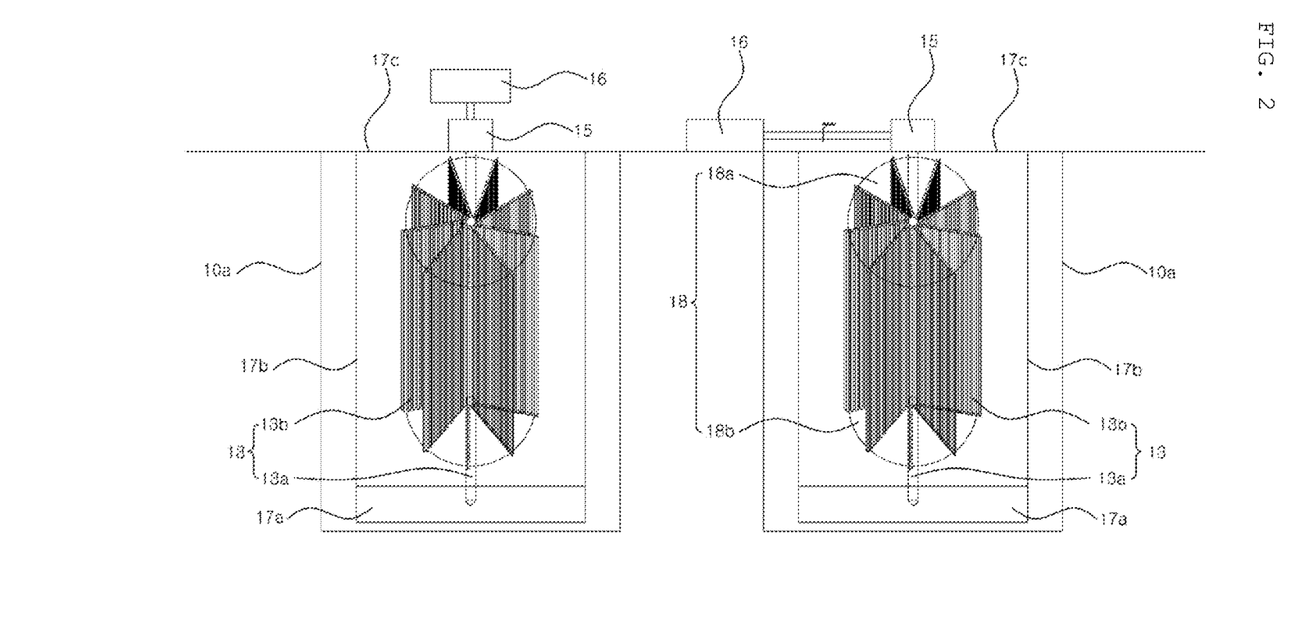
FIG. 2 is a schematic view illustrating a state in which a waterwheel module is installed in the tidal power generation apparatus of FIG. 1.
Figure 3:
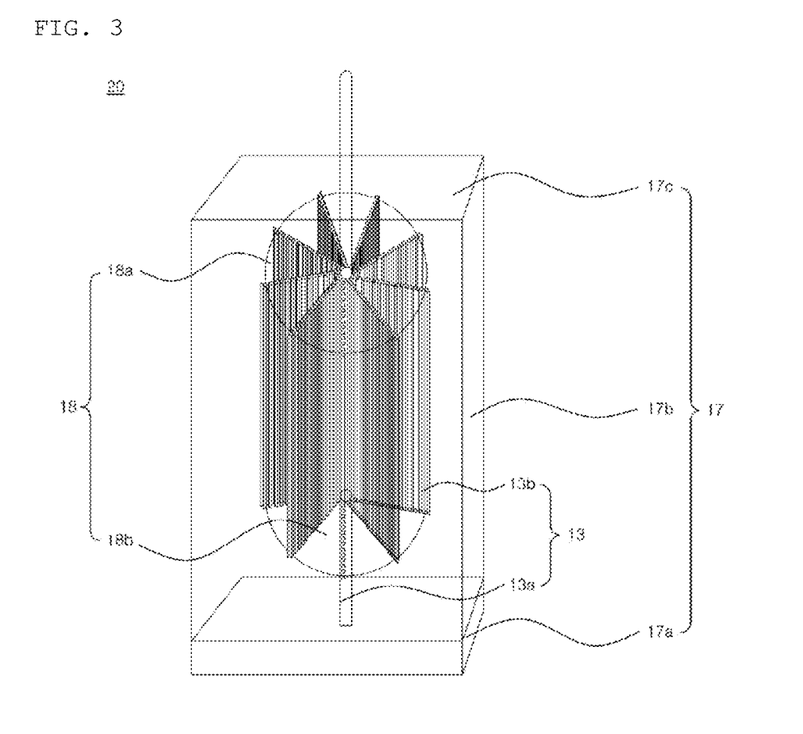
FIG. 3 is a view of the waterwheel module of FIG. 2, according to an embodiment.

FIG. 2 is a schematic view illustrating a state in which a waterwheel module is installed in the tidal power generation apparatus of FIG. 1. FIG. 3 is a view of the waterwheel module of FIG. 2, according to an embodiment.

Referring to FIGS. 1 to 3, the waterwheel module 20 may be installed at each of the installation grooves 10a of the channel levee 10 to generate power using the tidal current. For example, power may be generated four times a day, i.e., during two rising tides and two ebbing tides. The waterwheel module 20 may include a vertical waterwheel 13, a main frame 17, and a vertical waterwheel blade support plate 18.

The vertical waterwheel 13 may include a vertical waterwheel shaft 13a vertically installed in the main frame 17 and vertical waterwheel blades 13b connected to the vertical waterwheel shaft 13a and radially arranged based on the vertical waterwheel shaft 13a. The vertical waterwheel blades 13b horizontally rotate by movement of the tidal current, and the vertical waterwheel shaft 13a rotates as the vertical waterwheel blades 13b rotate.

The vertical waterwheel blades 13b may have a flat plate shape, and absorb tidal energy by coming into contact with the tidal current and transmit the tidal energy to the vertical waterwheel shaft 13a. The vertical waterwheel blades 13b are hidden inside the installation grooves 10a of the channel levee 10 in an area incapable of absorbing tidal energy, thereby minimizing resistance, resulting in formation of the most ideal rotation structure.

In addition, the vertical module 20 may be installed in plural on each of the opposite side surfaces of the channel 14, and thus the amount of power generated may be increased.

The vertical waterwheel 13 may be installed at the main frame 17, and the main frame 17 may be installed at each installation groove 10a of the channel levee 10. The main frame 17 may include a lower fixing support 17a, a support frame 17b, and an upper plate cover 17c.

The lower fixing support 17a may rotatably support a lower end of the vertical waterwheel shaft 13a. The upper plate cover 17c is positioned above the lower fixing support 17a and may rotatably support an upper end of the vertical waterwheel shaft 13a. The upper end of the vertical waterwheel shaft 13a may penetrate the upper plate cover 17c.

The support frame 17b is positioned between the lower fixing support 17a and the upper plate cover 17c, and is connected to the lower fixing support 17a and the upper plate cover 17c.

The vertical waterwheel blade support plate 18 is installed in an inner space of the main frame 17 and is axially coupled to the vertical waterwheel shaft 13a. The vertical waterwheel blade support plate 18 may include vertical waterwheel upper blade support plates 18a positioned at upper portions of the vertical waterwheel blades 13b to support upper ends of the vertical waterwheel blades 13b, and vertical waterwheel lower blade support plates 18b positioned at lower portions of the vertical waterwheel blades 13b to support lower ends of the vertical waterwheel blades 13b.

The generator 16 may be connected to the vertical waterwheel shaft 13a and generate power using rotational force of the vertical waterwheel shaft 13a. In addition, a transmitter 15 may be connected to the vertical waterwheel shaft 13a, and the generator 16 may receive rotational force of the vertical waterwheel shaft 13a via the transmitter 15 to generate power. The generator 16 may be installed on an upper portion of the channel levee 10 or the upper plate cover 17c.

Thus, the waterwheel modules 20 of the tidal power generation apparatus 1 according to the present embodiment may be simply installed at or separated from the installation grooves 10a of each channel levee 10, and thus convenient follow-up management may be enabled.

Figure 4:
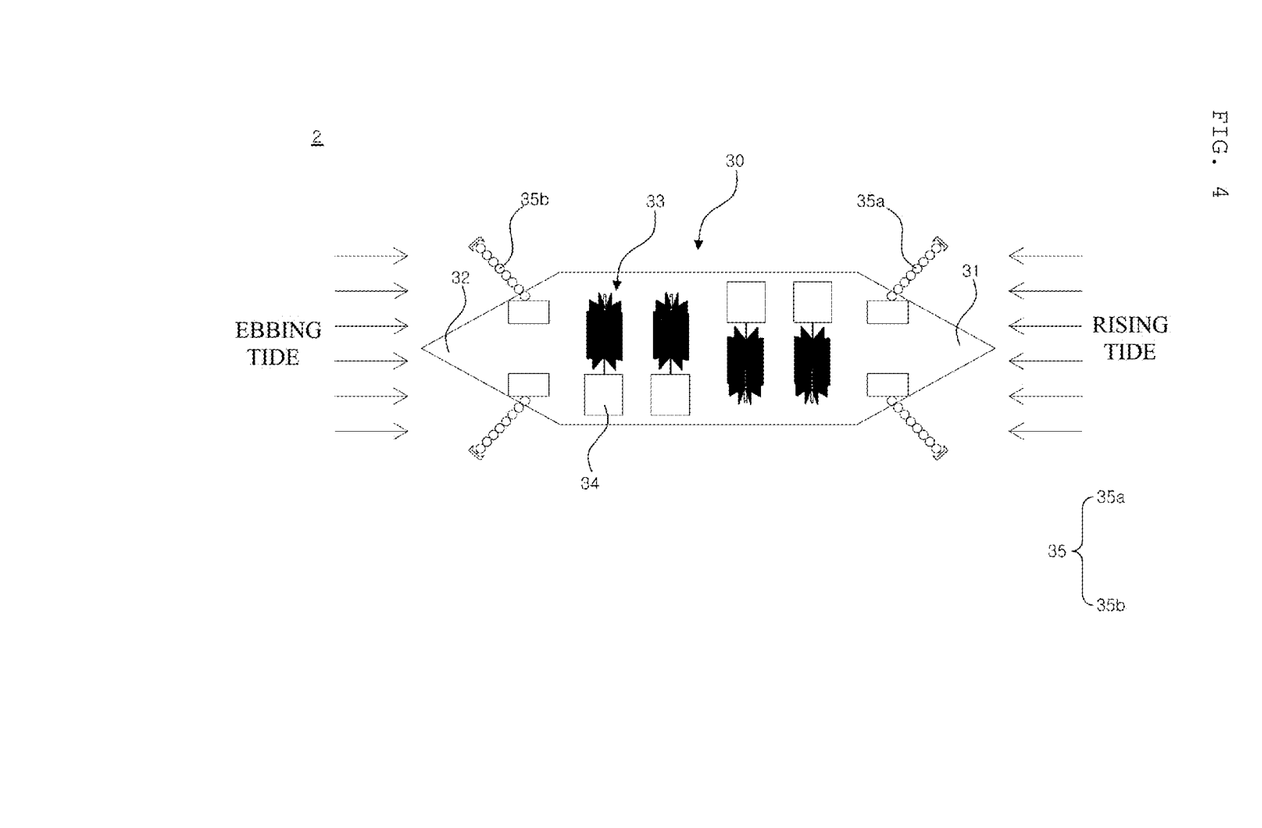
FIG. 4 is a schematic view illustrating a state in which a tidal power generation apparatus according to another embodiment of the present invention is installed in the sea.
Figure 5:
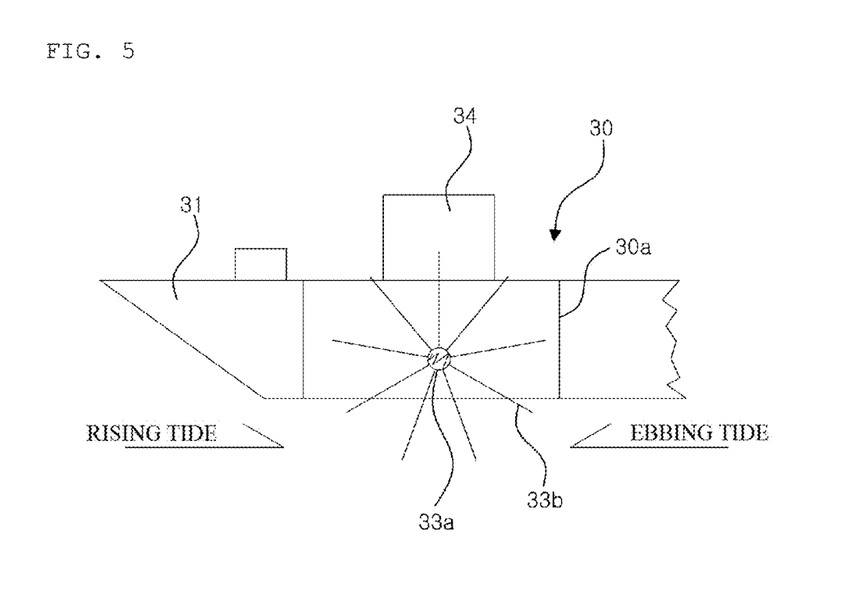
FIG. 5 is a schematic view illustrating a state in which a horizontal waterwheel of the tidal power generation apparatus of FIG. 4 is installed.

FIG. 4 is a schematic view illustrating a state in which a tidal power generation apparatus according to another embodiment of the present invention is installed at sea. FIG. 5 is a schematic view illustrating a state in which horizontal waterwheels of the tidal power generation apparatus of FIG. 4 are installed. Referring to FIGS. 4 and 5, the tidal power generation apparatus 2 according to the present embodiment may include an air cushion vessel 30, the horizontal waterwheels 33, generators 34, and an anchor 35.

The air cushion vessel 30 may be installed in a river or at sea, and have a shape such that the width thereof decreases towards the bow and the stern based on a movement direction of the tidal current. The air cushion vessel 30 may have one or more installation holes 30a that are vertically opened.

The horizontal waterwheels 33 may be installed in the installation hole 30a of the air cushion vessel 30. The horizontal waterwheel 33 may include a horizontal waterwheel shaft 33a horizontally installed in the installation hole 30a, and horizontal waterwheel blades 33b connected to the horizontal waterwheel shaft 33a and radially arranged based on the horizontal waterwheel shaft 33a. The horizontal waterwheel blades 33b have a flat plate shape and vertically rotate by movement of the tidal current, and, as the horizontal waterwheel blades 33b rotate, the horizontal waterwheel shaft 33a rotates.

The generator 34 may be installed at the air cushion vessel 30 and connected to horizontal waterwheel shaft 33a. The generator 34 may generate power using rotational force of the horizontal waterwheel shaft 33a.

The anchor 35 may include bow anchors 35a connected to opposite sides of a bow 31 of the air cushion vessel 30, and stern anchors 35b connected to opposite sides of a stern 32 of the air cushion vessel 30. The bow anchors 35a may fix the bow 31 of the air cushion vessel 30 with respect to movement of the tidal current (rising tide), and the stern anchors 35b may fix the stern 32 of the air cushion vessel 30 with respect to movement of the tidal current (ebbing tide).

Thus, the bow 31 of the air cushion vessel 30 proceeds straight during a rising tide and the stern 32 of the air cushion vessel 30 proceeds straight during an ebbing tide.

In addition, the horizontal waterwheel blades 33b may absorb tidal energy by coming into contact with the tidal current to transmit the tidal energy to the horizontal waterwheel shaft 33a. The horizontal waterwheel blades 33b are moved in the air outside the water surface in an area incapable of absorbing tidal energy, thereby minimizing rotation resistance, resulting in an increase in rotation rate of the horizontal waterwheel blades 33b and an increase in power generation efficiency.

Figure 6:
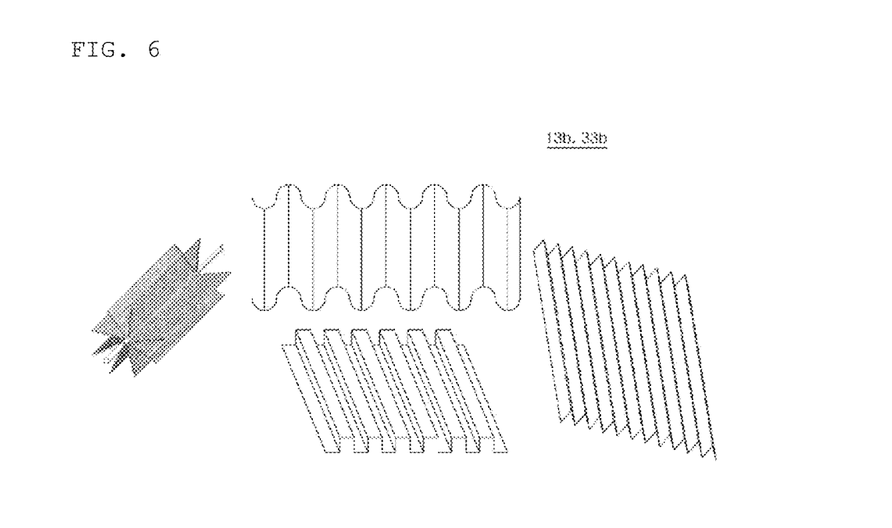
FIG. 6 is a schematic view illustrating shapes of a vertical waterwheel blade of FIG. 3 and a horizontal waterwheel blade of FIG. 5.

FIG. 6 is a schematic view illustrating shapes of the vertical waterwheel blade of FIG. 3 and the horizontal waterwheel blade of FIG. 5. Referring to FIG. 6, the vertical waterwheel blade 13b and the horizontal waterwheel blade 33b that may be applied to tidal power generation apparatuses of the present invention may have a wider surface area than that of a plane shape to enhance tidal energy absorption efficiency. That is, the vertical waterwheel blade 13b and the horizontal waterwheel blade 33b may have an uneven cross-sectional shape, a wavy cross-sectional shape, or a toothed cross-sectional shape.

INDUSTRIAL APPLICABILITY

The present invention may be applied to various types of tidal power generation apparatuses.

The invention claimed is:

1. A tidal power generation apparatus comprising:
a plurality of channel levees spaced apart from each other to form a channel having a constant width, allowing tidal current to move forward or backward of the channel, and each having a plurality of installation grooves formed in a recessed shape at a surface thereof facing the channel;
a first water collection levee extending from a front end of each channel levee based on a movement direction of the tidal current and having a tapered shape such that a width thereof gradually decreases towards the front of the channel;
a second water collection levee extending from a rear end of the channel levee based on a movement direction of the tidal current and having a tapered shape such that a width thereof gradually decreases towards the rear of the channel; and
waterwheel modules inserted into the installation grooves and capable of generating power using movement of the tidal current,
wherein the waterwheel module comprises:
a vertical waterwheel comprising a vertical waterwheel shaft vertically installed in the installation groove and vertical waterwheel blades connected to the vertical waterwheel shaft, radially arranged based on the vertical waterwheel shaft, and having a flat plate shape;
a main frame comprising a lower fixing support positioned at a lower portion of the vertical waterwheel shaft to support a lower end of the vertical waterwheel shaft, an upper plate cover positioned above the lower fixing support and supporting an upper end of the vertical waterwheel shaft, and a support frame positioned at one side of the vertical waterwheel shaft and connected to the lower fixing support and the upper plate cover;
vertical waterwheel upper and lower blade support plates coupled to the vertical waterwheel shaft and positioned at upper and lower portions, respectively, of the vertical waterwheel blades to respectively support upper and lower ends of the vertical waterwheel blades; and a generator connected to the vertical waterwheel shaft and generating power using rotational force of the vertical waterwheel shaft.

2. The tidal power generation apparatus according to claim 1, wherein the vertical waterwheel blades have one shape selected from an uneven cross-sectional shape, a wavy cross-sectional shape, and a toothed cross-sectional shape.

\* \* \* \* \*